United States Patent [19]

Matsuda

[11] Patent Number: 5,119,251
[45] Date of Patent: Jun. 2, 1992

[54] REDUCED CLEARANCE CASSETTE SECURING ARRANGEMENTS IN A CASSETTE-BASED RECORDING/REPRODUCING APPARATUS

[75] Inventor: Takashi Matsuda, Hyogo, Japan

[73] Assignee: Matsubishi Denki Kabushiki Kaisha, Tokyo, Japan

[21] Appl. No.: 503,532

[22] Filed: Apr. 3, 1990

[30] Foreign Application Priority Data

Apr. 4, 1989 [JP] Japan ................................ 1-83973

[51] Int. Cl.⁵ .............................................. G11B 5/008
[52] U.S. Cl. .................................................. 360/96.5
[58] Field of Search ........................................ 360/96.5

[56] References Cited

U.S. PATENT DOCUMENTS 4,792,872 12/1988 Nakanishi et al. .

FOREIGN PATENT DOCUMENTS 62-209762 9/1987 Japan .

Primary Examiner—A. J. Heinz
Attorney, Agent, or Firm—Burns, Doane, Swecker & Mathis

[57] ABSTRACT

A cassette-based recording/reproducing apparatus comprises a cassette holder 2 which is provided in a base 4 and is moved in the base between a first position and a second position while holding a cassette 1 therein. A resilient engagement member 6 is mounted to the cassette holder 2 and engages the cassette 1 to hold the cassette 1 in the cassette holder 2. A disengaging member 10 is mounted to the base 4 and engages the resilient engagement member 6 for causing the resilient engagement member 6 to resiliently deflect to move out of engagement with the cassette 1 when the cassette holder 2 is at the first position, and disengages from the resilient engagement member 6 for allowing the resilient engagement member 6 to move out of engagement with the disengaging member 10 to subsequently engage the cassette 1 to securely urge the cassette 1 against the cassette holder 2 when the cassette holder 2 is at the second position. The disengaging member 10 is made of a resilient maerial having less resiliency than the resilient engagement member 6, and deflects yieldably to allow the cassette holder 2 to pass when pushed by the cassette holder 2 as the cassette holder 2 moves from the second position to the first position.

4 Claims, 7 Drawing Sheets

PRIOR ART

PRIOR ART

1

REDUCED CLEARANCE CASSETTE SECURING ARRANGEMENTS IN A CASSETTE-BASED RECORDING/REPRODUCING APPARATUS

BACKGROUND OF THE INVENTION

1. Field of the Invention

The present invention relates to a cassette-based recording/reproducing apparatus having a holding mechanism in which a resilient engagement member engages a fitting portion formed on the cassette to hold the cassette in place within a cassette holder.

2. Prior Art

FIGS. 6-9 show a conventional cassette-based recording/reproducing apparatus disclosed in Japanese Patent Preliminary Publication No. 62-209762. FIG. 6 is a perspective view of a digital audio tape recorder (DAT), one type of the cassette-based recording/reproducing apparatus into which the cassette 1 is about to be inserted. FIG. 7 is a cross-sectional view of core elements of this DAT when the cassette has been inserted into a cassette-inserting position. FIG. 8 is a perspective view of the cassette-based recording/reproducing apparatus where the cassette holder 2 is on the part way when it is being moved toward a cassette-loading position and FIG. 9 is a cross-sectional view of the core elements in FIG. 8. In the figures, a cassette 1 is formed with a recess 5 on the surface thereof which acts as a fitting portion. The cassette holder 2 moves between the cassette-inserting position (shown in FIG. 7) and the cassette-loading position (not shown). A retaining spring 3 is secured to the cassette holder 2 to retain the cassette 1 in the cassette holder 2. A base 4 is formed with a guiding slot 4a therein for guiding the cassette holder 2.

A resilient engagement member 6 is formed of a leaf spring 6a and a hook 6b attached to the tip end of the leaf spring 6a, and is mounted to the cassette holder 2 such that the leaf spring 6a deflects resiliently. The hook 6b has two wings 6d extending transversely of the leaf spring 6a and beveled surfaces 6c. An arm 7 is made of a non-resilient material and functions as a disengaging member.

The operation of the above-mentioned prior art DAT will be described below. When the cassette 1 is inserted in a direction of arrow A, the cassette 1 is urged against the cassette holder 2 by the retaining spring 3 to be held in sandwiched relation between the cassette holder 2 and the retaining spring 3. The beveled surface 6c of the resilient engagement member 6 engages the beveled surface 7a of an arm 7 to climb up the surface 7a. At this cassette-inserting position, wings 6d of the resilient engagement member 6 ride on the arms 7 and is deflected as depicted by solid lines in FIG. 11; therefore the hook 6b is out of engagement with the recess 5. Then, when the cassette holder 2 is moved by a drive source (not shown) from the cassette-inserting position in a direction of arrow B shown in FIG. 7, the wing 6d slides on the arm 7 in a direction of C as shown in FIG. 9. The hook 6b will eventually slide off the arm 7 to engage the recess 5 of the cassette 1 with the aid of the urging force of the leaf spring 6a, thereby fixing the cassette 1 in the cassette holder 2.

When the cassette 1 is to be taken out of the apparatus, the cassette holder 2 is moved by the drive source (not shown) from the cassette-loading position back to the cassette-inserting position causing the beveled surface 6c to engage the tip end of the arm 7 to climb up the beveled surface 7a. Thus, the hook 6b again takes up the position (cassette-inserting position) shown in FIG. 7 to become out of engagement with the recess 5, leaving the cassette holder 2 held only by the urging force of the retaining spring 3 at the cassette-inserting position. Thereafter the cassette 2 is taken out manually from the cassette holder 2.

To ensure that the wing 6c climbs the tip end surface 7a for causing the hook 6b to move out of engagement with the recess 5, a clearance D is required between the base 4 and the cassette holder 2 as shown in FIG. 7. If the clearance D is to be reduced for the reduced overall height of the apparatus, then the problem is that the arm 7 extends into the cassette holder 2 to block the movement of the cassette holder 2 when the cassette holder 2 is moved from the cassette loading position to the cassette-inserting position in a direction of arrow E as shown in FIG. 10.

SUMMARY OF THE INVENTION

An object of the present invention is to provide a cassette-based recording/reproducing apparatus which is of simple construction and of a thin shape.

A cassette-based recording/reproducing apparatus according to the present invention comprises:

a cassette holder 2 provided in a base 4, the cassette moving in the base between a first position and a second position while holding a cassette therein;

a resilient engagement member mounted to the cassette holder, the resilient engagement member engaging the cassette to hold the cassette in the cassette holder 2;

a disengaging member mounted to the base, the disengaging member engaging the resilient engagement member for causing the resilient engagement member to resiliently deflect to move out of engagement with the cassette when the cassette holder is at the first position, the disengaging member disengaging from the resilient engagement member for allowing the resilient member to move out of engagement with the disengaging member to subsequently engage the cassette securely urge the cassette against the cassette holder when the cassette holder is at the second position; CHARACTERIZED in that the disengaging member is made of a resilient material having less resiliency than the resilient engagement member, and deflects yieldably to allow the cassette holder to pass thereby when pushed by the cassette holder as the cassette holder moves from the second position to the first position.

BRIEF DESCRIPTION OF THE DRAWINGS

Features and other objects of the invention will be more apparent from the detailed description of the preferred embodiments with reference to the accompanying drawings in which:

FIG. 5 generally illustrates the successive positional relation between the arm 10, the resilient engagement member 6, and the cassette holder 2 in particular, when the cassette 1 is taken out from the cassette holder 2;

FIG. 5B illustrates a position wherein the cassette pushes up the arm 10 to deflect the portion 10a;

DISCLOSURE OF THE PREFERRED EMBODIMENTS

The present invention will now be described in detail with reference to the drawings.

Figure 1:
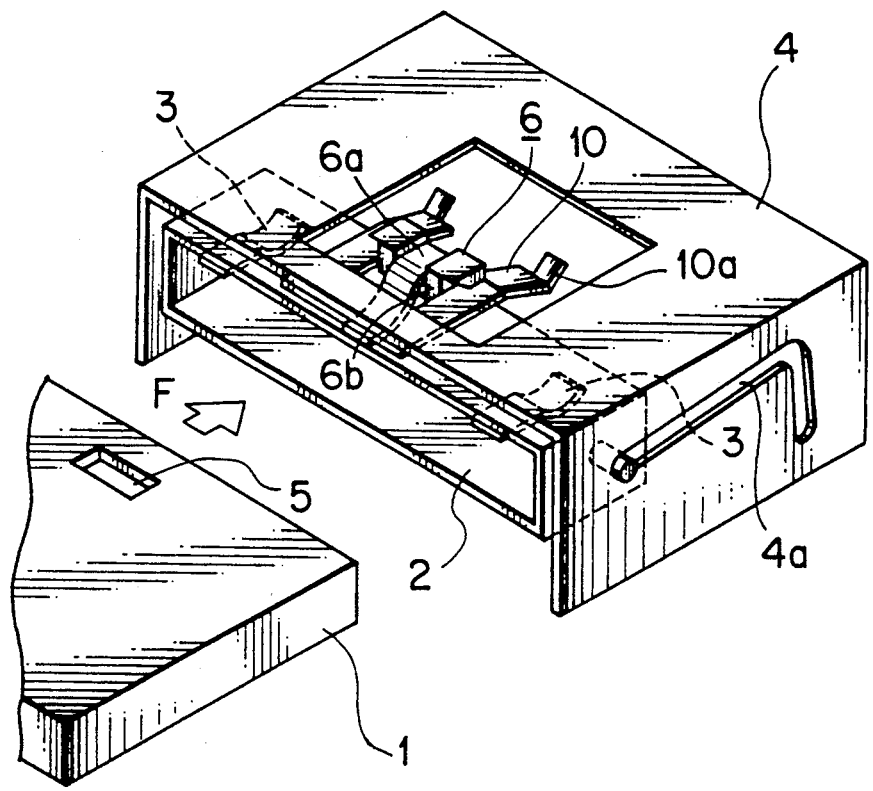
FIG. 1 is a perspective view of a digital tape recorder (DAT), one type of a cassette-based recording/reproducing apparatus, just before the cassette is inserted in to the cassette-inserting position.
Figure 2:
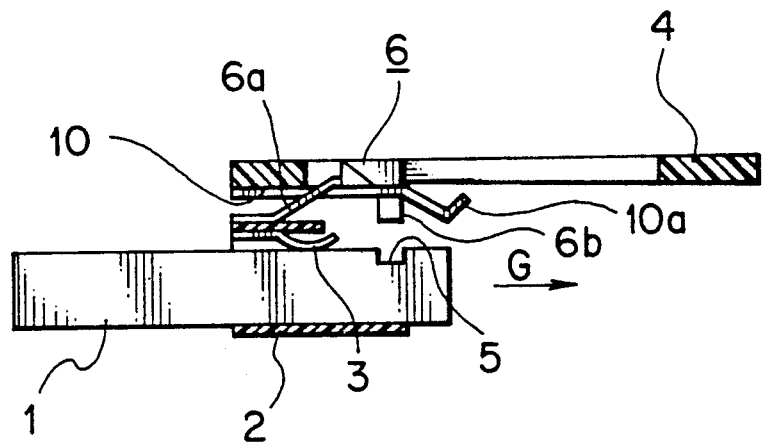
FIG. 2 is a cross-sectional view of a particular detail of a cassette-based recording/reproducing apparatus when the cassette is inserted into the apparatus.
Figure 3:
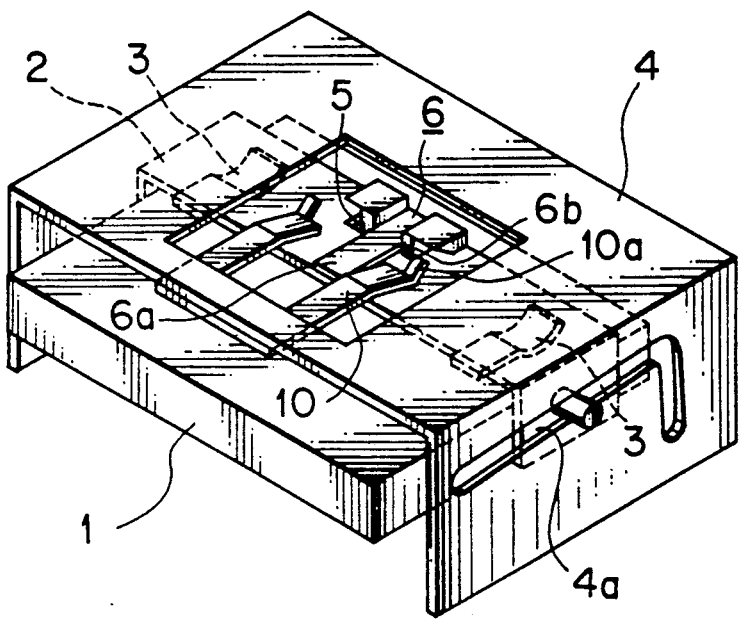
FIG. 3 is a perspective view of the apparatus when the cassette is being moved from the cassette-inserting position to the cassette-loading position.
Figure 4:
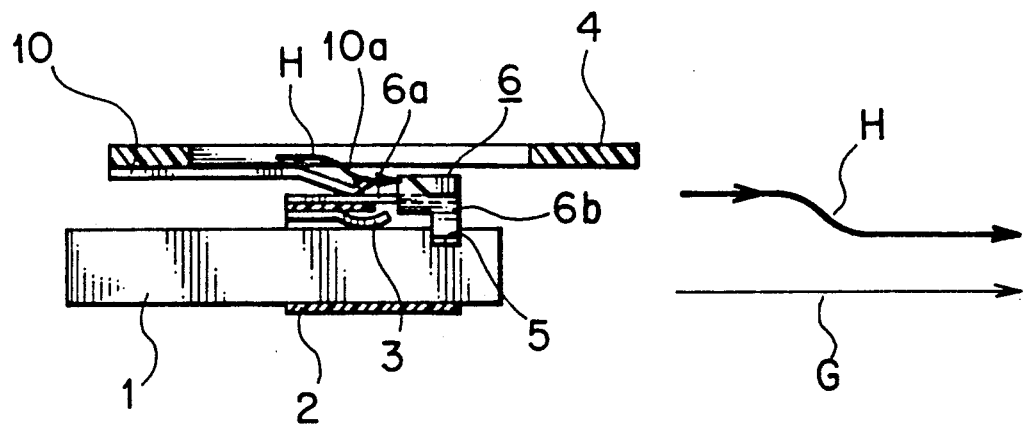
FIG. 4 is a cross-sectional view of the core portion of FIG. 3.
Figure 5A:
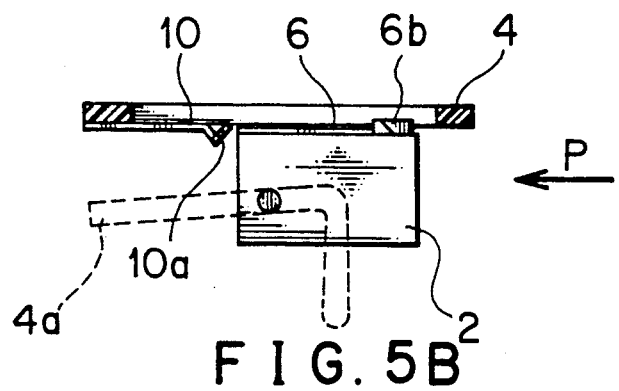
FIG. 5A illustrates a position wherein the resilient engagement member is in the least deflected condition.
Figure 5B:
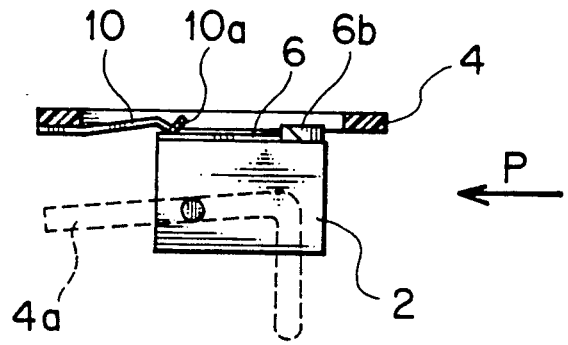
Figure 5C:
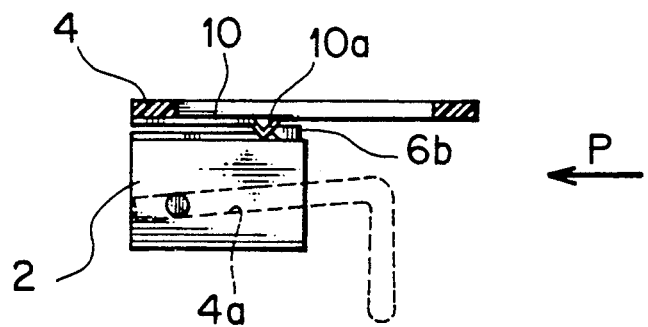
FIG. 5C illustrates a position wherein the cassette holder has descended somewhat and the arm 10 has lost some of its previous deflection.
Figure 5D:
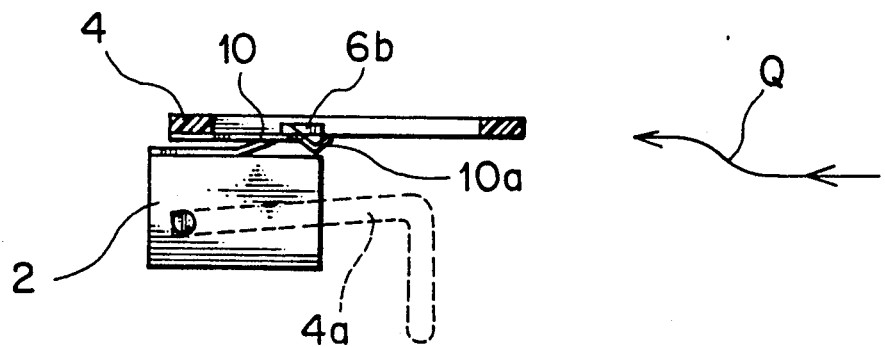
FIG. 5D illustrates a position wherein the resilient engagement member disengages from the cassette and is in the most deflected condition.
Figure 6:
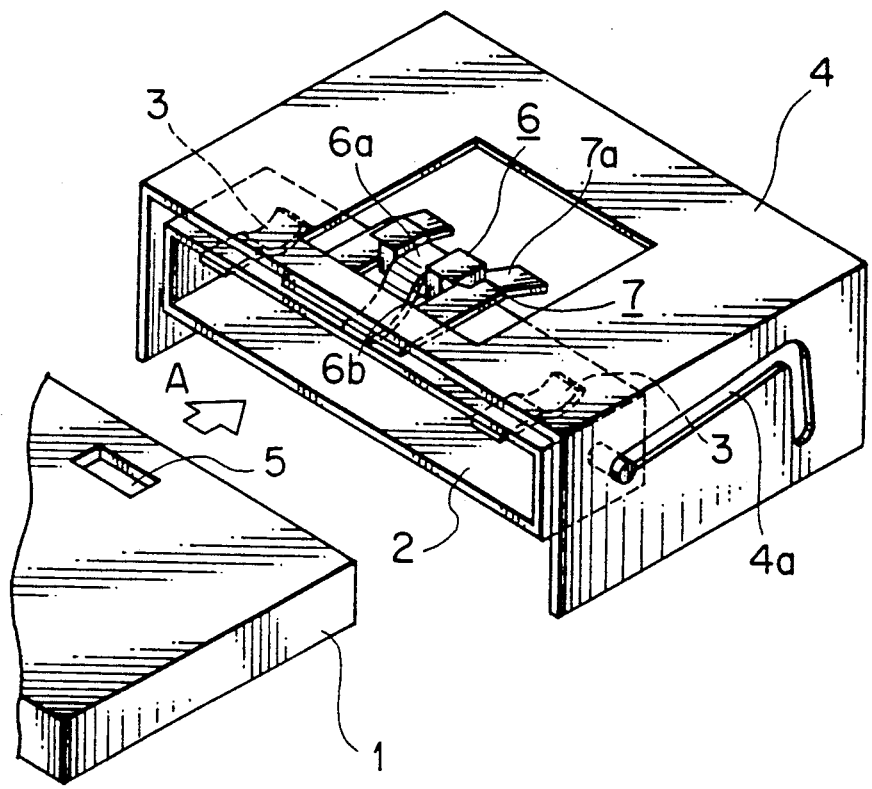
FIG. 6 is a perspective view of a prior art cassette-based recording/reproducing apparatus before the cassette is inserted.
Figure 7:
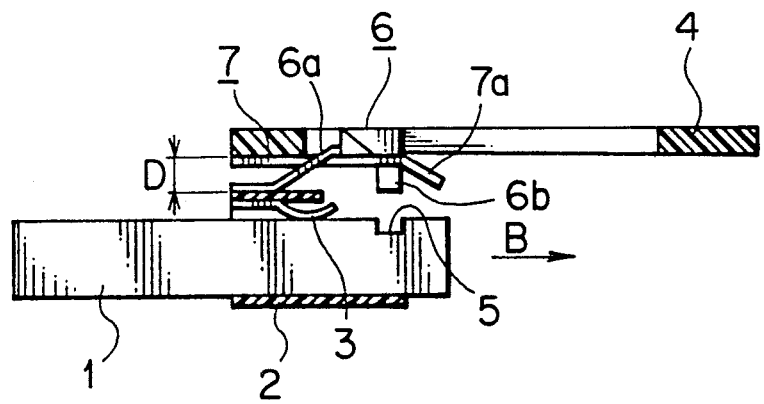
FIG. 7 is a cross-sectional view of relevant portion of FIG. 6 when the cassette has been inserted.
Figure 8:
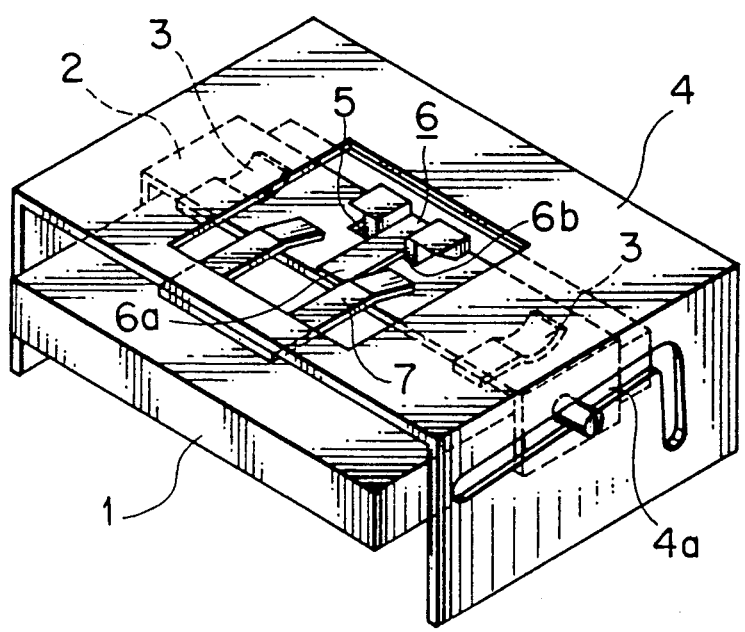
FIG. 8 is a perspective view of the prior art cassette-based recording/reproducing apparatus shown in FIG. 6 where the cassette holder is on the part way when it is being moved toward the cassette-loading position.
Figure 9:
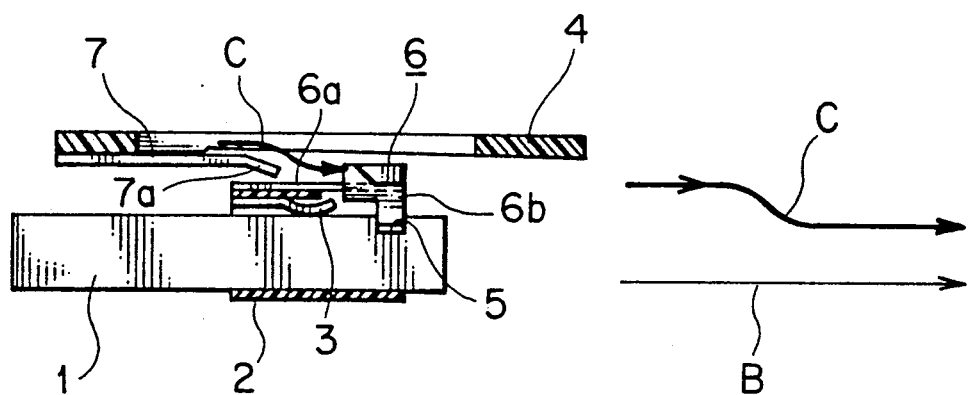
FIG. 9 is a cross-sectional view of relevant portion of FIG. 8 when the cassette is at the cassette loading position.
Figure 10:
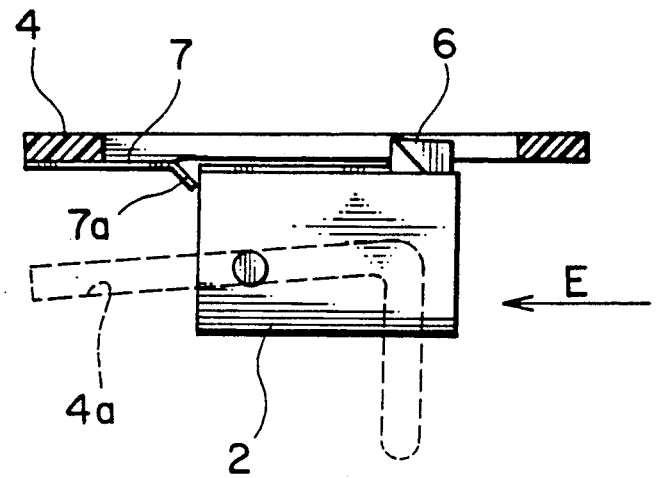
FIG. 10 shows the prior art apparatus where the arm extends into the cassette holder to block the movement of the cassette holder when the cassette holder is moved from the cassette loading position to the cassette-inserting position.

FIGS. 1–4 illustrate an embodiment of the invention. FIG. 1 is a perspective view of a digital tape recorder (DAT), one type of a cassette-based recording/reproducing apparatus, just before the cassette is inserted into the cassette-inserting position. FIG. 2 is a cross-sectional view of a particular detail of the cassette-based recording/reproducing apparatus in FIG. 1 when the cassette is inserted into the apparatus (cassette-inserting position). FIG. 3 is a perspective view of the apparatus when the cassette 1 is being moved from the cassette-inserting position to the cassette-loading position. FIG. 4 is a cross-sectional view of the core portion of FIG. 3. Elements similar to those in FIGS. 6–9 have been given the same reference numerals as in FIGS. 6–9.

Figure 11:
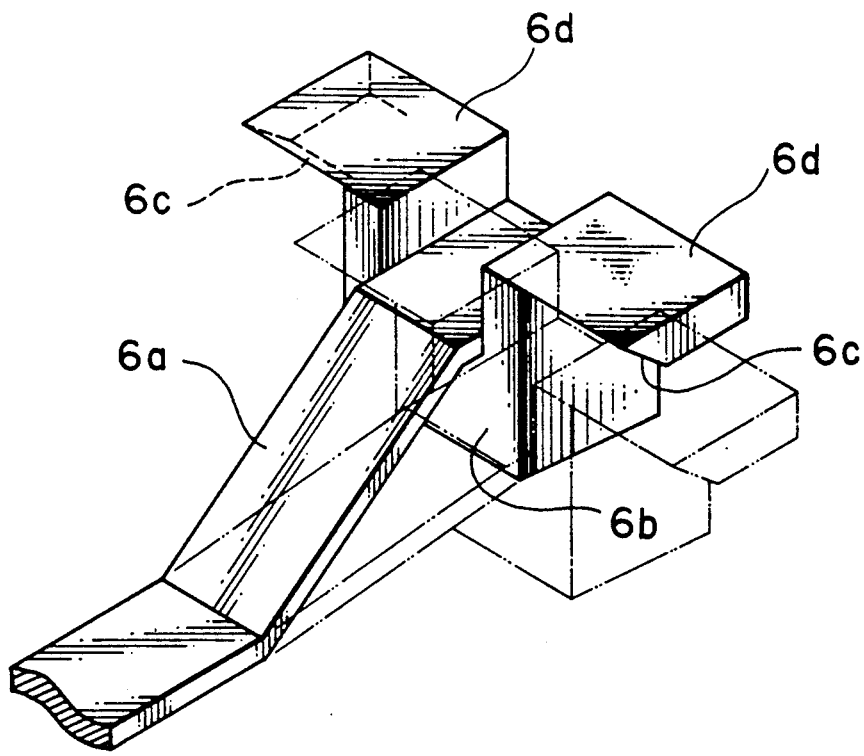
FIG. 11 shows a resilient engagement member used in the present invention as well as in the prior art apparatus.
Figure 12A:
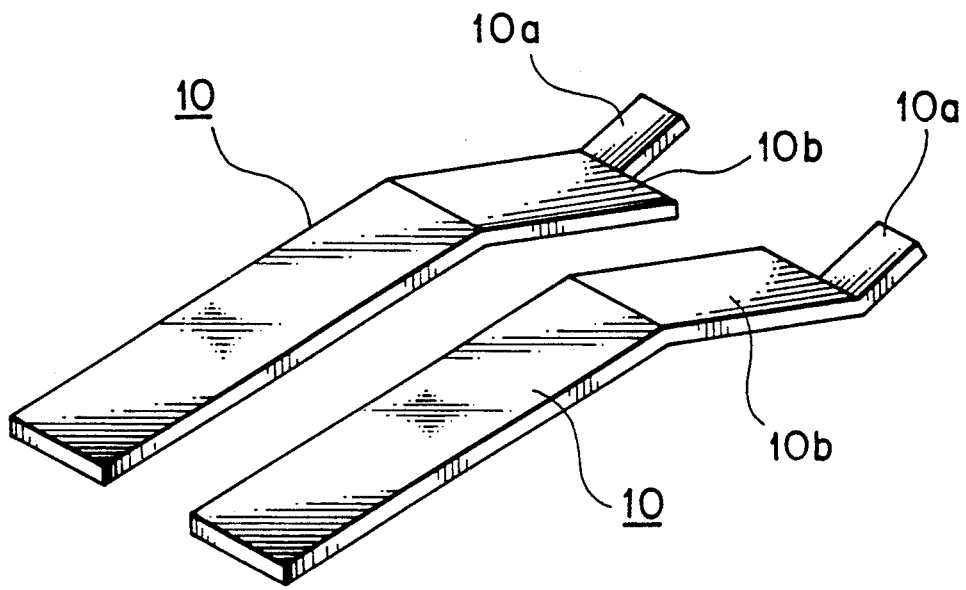
FIGS. 12A and 12B show the resilient engagement member used in the present invention.
Figure 12B:
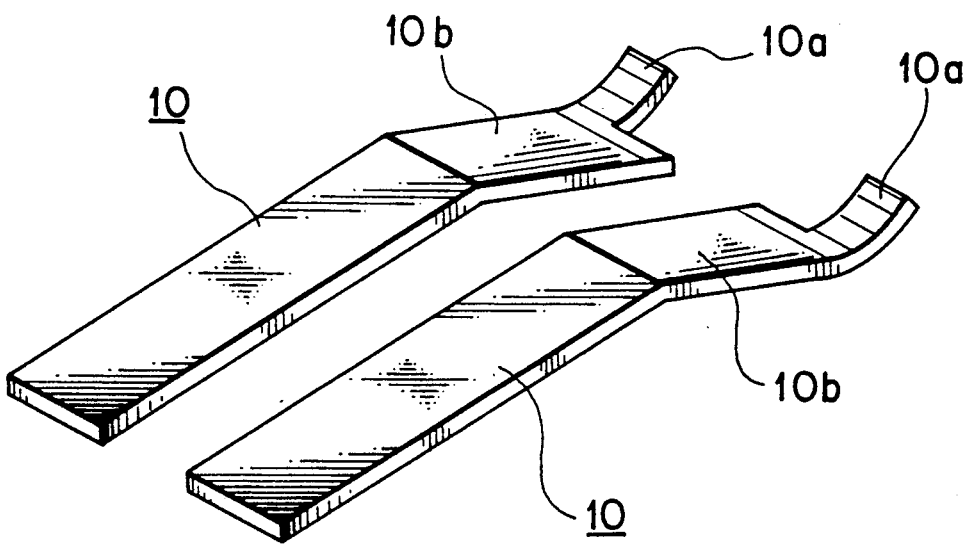

In the figures, a resilient arm 10 as a disengaging member is secured at a base portion thereof to a base 4. As shown in FIGS. 12A–12B, the arm 10 has a beveled surface 10b and is formed with a bent portion 10a in the form of a substantially L shape or semi-circle on a part of the tip end of the beveled surface 10b. As shown in FIG. 11, the resilient engagement member 6 is formed of the leaf spring 6a, the hook 6b, and the two wings 6d extending transversely of the leaf spring 6a. The leaf spring 6a is more yieldable than the resilient arm 10. Each of the two wings 6d has a beveled surface 6c on the underside thereof. When the cassette 1 is inserted in a direction of arrow F shown in FIG. 1 into the cassette-inserting position, the cassette 1 is urged against the cassette holder 2 by a retaining spring 3 such that the cassette 1 is securely held in the cassette holder. At this cassette-inserting position, the wings 6d as shown in FIG. 11 ride on the beveled surface 10b of the arms 10 and is deflected as depicted by solid lines in FIG. 11; therefore the hook 6b is out of engagement with the recess 5 of the cassette 1.

When the cassette holder 2 is moved further into the apparatus as shown in FIGS. 3–4 by the drive source (not shown) from the cassette-inserting position toward the cassette-loading position. The resilient engagement member 6 slides in a "snaking fashion" in a direction of arrow H while the cassette holder 2 moves straightly in the direction G, the leaf spring 6a becoming progressively less deflected. It should be noted that the cassette holder 2 is gradually lifted by means of inclined guiding slot 4a as the cassette holder 2 is moved toward the cassette-loading position. Thus, the wings 6d will eventually be out of engagement with the arm 10 such that the hook 6d subsequently engages the recess 5 formed on the cassette 1 with the aid of the urging force of the leaf spring 6a, thereby securely holding the cassette 1 in the cassette holder 2. When the cassette holder 2 is at the cassette loading position, the resilient engagement member is in the least deflected condition as depicted in phantom lines in FIG. 11. It should be noted that the wings 6d extend such that they do not touch the bent portion 10a but smoothly slides off the beveled surface 10b.

When the cassette 1 is to be taken out from the apparatus, the cassette holder 2 is moved by the drive source from the cassette-loading position to the cassette-inserting position, and the wings 6d climb up the beveled surface 10b of the arm 10. Since the wings 6d do not extend beyond the bent portion 10a of the arm 10, the beveled surface 6c easily slides over the surface 10b to ride on the arm 10. Being guided by the guiding hole 4a, the cassette holder 2 is gradually lowered as it moves back toward the cassette-inserting position. The leaf spring 6a increasingly deflects as the cassette holder 2 becomes closer to the cassette-inserting position. Thus, the hook 6b disengages from the recess 5 as shown in FIG. 2 the cassette holder 2 to be held only by the urging force of the retaining spring 3 at the cassette-inserting position. Thereafter, the cassette is taken out manually from the cassette holder 5.

FIG. 5 illustrates the successive positional relation between the arm 10, the resilient engagement member 6, and the cassette holder 2 when the cassette 1 is taken out from the cassette holder 2. The cassette holder 2 is moved in a direction of arrow P to abut the bent portion 10a of the arm 10 (FIG. 5A). Since the hook 6b is in engagement with the recess 5 of the cassette 1, the resilient engagement member is in the least deflected condition as depicted in phantom lines in FIG. 11. The cassette advances further, pushing up the arm 10 to deflect the portion 10a (FIG. 5B). At this time, the bent portion 10a formed at the tip end of the beveled surface permits the cassette holder 2 to smoothly push the arm 10 sideways as the cassette holder is moved toward the cassette-inserting position. Being guided by the guiding slot 4a, the cassette holder 2 descends gradually as it moves toward the cassette-inserting position, while at the same time the arm 10 gradually loses its deflection (FIG. 5C). With the further movement of the cassette holder 2, the wings 6d starts to climb the beveled surface 10b of the arm 10 to ride on the arm 10, thereby permitting hook 6b to move out of engagement with the recess 5. Thus, when the cassette holder 2 is at the cassette-inserting position, the resilient engagement member 6 disengages from the cassette 1 (FIG. 5D) and is in the most deflected condition as depicted by the solid lines in FIG. 11.

While the embodiment has been described in the form of a DAT (digital audio tape recorder) as a cassette-based recording/reproducing apparatus, the present invention may also be applied to any type of cassette-based apparatuses using a cassette which accommodates a magnetic disk or an optical disk. While the arm 10 has been described as having a bent portion 10a in the form of the L shape or a semi-circle, the bent portion 10a may be of any shape such as far as the bent portion is resiliently deflected when the cassette holder 2 pushes the tip end of the bent portion such that the cassette holder 2 can move toward the cassette inserting position.

What is claimed is:

1. A cassette-based recording/reproducing apparatus comprising:
    a cassette holder (2) provided in a base (4), said cassette holder moving in said base between a first position and a second position while holding a cassette therein;
    a resilient engagement member mounted to said cassette holder, said resilient engagement member engaging said cassette to hold said cassette in said cassette holder (2);
    a disengaging member mounted to said base, said disengaging member engaging said resilient engagement member for causing said resilient engagement member to resiliently deflect to move out of engagement with said cassette when the cassette holder is at said first position, said disengaging member disengaging from said resilient engagement member for allowing said resilient member to move out of engagement with said disengaging member to subsequently engage said cassette to securely urge said cassette against said cassette holder when the cassette holder is at said second position; wherein
    said disengaging member is made of a resilient material having less resiliency than said resilient engagement member, and deflects yieldably to allow said cassette holder to pass thereby when pushed by said cassette holder as the cassette holder moves from said second position to said first position.

2. A cassette-based recording/reproducing apparatus according to claim 1, wherein said disengaging member is made of a resilient arm secured at an end thereof to said base and having at a tip end thereof a beveled surface that assists said resilient engagement member to engage and disengage from said disengaging member, said resilient arm having a bent portion that assists said disengaging member to smoothly deflect yieldably for allowing said cassette holder to pass thereby when pushed by said cassette holder as the cassette holder moves from said second position to said first position.

3. A cassette-based recording/reproducing apparatus according to claim 2, wherein said bent portion is substantially curved.

4. A cassette-based recording/reproducing apparatus according to claim 2, wherein said bent portion is substantially L-shape.

* * * * *